United States Patent
Wu

(10) Patent No.: US 10,314,044 B2
(45) Date of Patent: Jun. 4, 2019

(54) METHOD, APPARATUS AND SYSTEM FOR CONTROLLING ACQUISITION OF LOCATION INFORMATION OF M2M NODE, AND STORAGE MEDIUM

(71) Applicant: ZTE Corporation, Shenzhen (CN)

(72) Inventor: Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/549,400

(22) PCT Filed: Oct. 27, 2015

(86) PCT No.: PCT/CN2015/092993
§ 371 (c)(1),
(2) Date: Aug. 8, 2017

(87) PCT Pub. No.: WO2016/127662
PCT Pub. Date: Aug. 18, 2016

(65) Prior Publication Data
US 2018/0027543 A1      Jan. 25, 2018

(30) Foreign Application Priority Data
Feb. 12, 2015 (CN) .......................... 2015 1 0074984

(51) Int. Cl.
| | |
|---|---|
| *H04W 72/04* | (2009.01) |
| *H04W 4/70* | (2018.01) |
| *H04W 8/02* | (2009.01) |
| *H04W 60/04* | (2009.01) |
| *H04W 64/00* | (2009.01) |

(52) U.S. Cl.
CPC ........... *H04W 72/048* (2013.01); *H04W 4/70* (2018.02); *H04W 8/02* (2013.01); *H04W 60/04* (2013.01); *H04W 64/006* (2013.01)

(58) Field of Classification Search
None
See application file for complete search history.

(56) References Cited

U.S. PATENT DOCUMENTS

2014/0031063 A1    1/2014  Park

FOREIGN PATENT DOCUMENTS

| CN | 102281494 A | 12/2011 |
| CN | 104093118 A | 10/2014 |
| WO | 2014169804 A1 | 10/2014 |

OTHER PUBLICATIONS

OneM2M Technical Specification, TS-0001-V1.4.2, Jan. 19, 2015, pp. 11-12, 22, 72-74, 83-113, 198-202 (Year: 2015).*

(Continued)

*Primary Examiner* — Joseph A Bednash
(74) *Attorney, Agent, or Firm* — Cantor Colburn LLP

(57) ABSTRACT

Provided are a method, apparatus and system for controlling acquisition of location information of a Machine-to-Machine (M2M) node, and a storage medium. In the method, a registration Common Service Entity (CSE) receives a resource request carrying a positioning parameter, and performs positioning control according to the positioning parameter carried in the resource request, and in this method, the positioning parameter may include a positioning interval and/or a positioning duration.

8 Claims, 1 Drawing Sheet

```
┌─────────────────────────────────────────────────┐   101
│   A registration CSE receives a resource request carrying a │
│ positioning parameter, and the positioning parameter may include │
│       a positioning interval and/or a positioning duration        │
└─────────────────────────────────────────────────┘
                          │
                          ▼
┌─────────────────────────────────────────────────┐   102
│ The registration CSE performs positioning control according to │
│  the positioning parameter carried in the resource request    │
└─────────────────────────────────────────────────┘
```

(56) References Cited

OTHER PUBLICATIONS

OMA-TS-REST-NetAPI_TerminalLocation-V1_0-20130924-A: "RESTful Network API for Terminal Location", Version 1.0, Sep. 24, 2013 (Year: 2013).*
International Search Report for corresponding No. PCT/CN2015/092993 filed on Oct. 27, 2015; dated Feb. 24, 2016.
European Search Report for corresponding application 15 88 1812; Report dated Jan. 16, 2018.
LG Electronics et al, "Location Request on Mcn Reference Point", vol. WG3, Jun. 12, 2014, pp. 1-8, XP084006574.
Rajesh Bhalla, et al:, "This document specifies the functional architecture for the oneM2M Services Platform", vol. WG2, Jan. 19, 2015, pp. 1-335, XP084009378.

* cited by examiner

METHOD, APPARATUS AND SYSTEM FOR CONTROLLING ACQUISITION OF LOCATION INFORMATION OF M2M NODE, AND STORAGE MEDIUM

TECHNICAL FIELD

The disclosure relates to a management technology for a Machine Type Communication (MTC) terminal, and more particularly to a method, apparatus and system for controlling acquisition of location information of a Machine-to-Machine (M2M) node, and a storage medium.

BACKGROUND

An M2M communication network may consist of various M2M nodes and a bearer network. The M2M nodes, as physical devices, may need to implement M2M services through communications between logical units included in the M2M nodes. One M2M node may include an Application Entity (AE) or a Common Service Entity (CSE). The AE is a logical unit for executing a practical M2M application. The CSE is a logical unit for managing the AE and the M2M node and providing services for the AE.

An AE may use a service, such as sending data to other AE or other CSE, provided by a CSE only after having been registered on the CSE, and this CSE may be referred to as a registration CSE of the AE. Meanwhile, as each CSE may provide different services, one CSE may be registered on another CSE so as to use a service provided by the latter CSE, and the latter CSE may also be referred to as a registration CSE of the former CSE.

An AE or a CSE on any M2M node may send a request to its own registration CSE to request to acquire location information of a specified M2M node. The location information of the M2M node may be acquired from a network by the registration CSE.

The AE or the CSE sends, to the registration CSE, a request for creating a 'location management' resource. Herein, 'location management' indicates the type of the resource, and may include a series of parameters related to acquisition of location information, for example, a node identifier of a node whose location information needs to be acquired, and a 'target node identifier' attribute is created under the 'location management' resource to store the node identifier of the node whose location information needs to be acquired. When the 'location management' resource is created, the registration CSE may synchronously create a 'container' type resource for storing acquired location information data. Meanwhile, a 'location container' attribute is created under the 'location management' resource to store an address of the 'container' type resource, and the 'location management' resource is associated with the 'container' resource.

Under present architecture, operation for acquisition of location information is not flexible enough. As a large amount of network resources, particularly radio resources, may need to be consumed during acquisition of the location information each time, the operation for acquisition of the location information adopted in the related technology easily result in increase of unnecessary resource consumption and generation of unnecessary expenses.

SUMMARY

Some embodiments of the disclosure provide a method, apparatus and system for controlling acquisition of location information of an M2M node, and a storage medium, which may solve the problem in the related technology.

The solution of the embodiments of the disclosure is implemented as follows.

An embodiment of the disclosure provides a method for controlling acquisition of location information of an M2M node. The method may include the acts as follows.

A registration CSE receives a resource request carrying a positioning parameter, and performs positioning control according to the positioning parameter carried in the resource request. In this embodiment, the positioning parameter may include a positioning interval and/or a positioning duration.

In an embodiment, the method may further include the following acts.

The registration CSE creates a 'location management' resource of a location management type according to the resource request.

When the positioning parameter carried in the resource request includes the positioning interval, the registration CSE creates, for the 'location management' resource, a 'positioning interval' attribute whose value is set as a value of the positioning interval in the resource request.

When the positioning parameter carried in the resource request includes the positioning duration, the registration CSE creates, for the 'location management' resource, a 'positioning duration' attribute whose value is set as a value of the positioning duration in the resource request.

In an embodiment, the act of performing positioning control according to the positioning parameter carried in the resource request may include the following acts. When the positioning parameter carried in the resource request includes the positioning interval or includes the positioning interval and the positioning duration, and when the value of the positioning interval in the resource request is not zero or not null, the 'positioning interval' attribute of the 'location management' resource is queried. When the 'positioning interval' attribute does not exist or the value of the 'positioning interval' attribute is zero or null, the registration CSE sends a positioning request message to a location server.

In an embodiment, the act of performing positioning control according to the positioning parameter carried in the resource request may include the following acts. When the positioning parameter carried in the resource request includes the positioning interval and the positioning duration, and when the value of the positioning interval in the resource request is not zero or not null, the 'positioning duration' attribute of the 'location management' resource is queried. When the 'positioning duration' attribute does not exist or the value of the 'positioning duration' attribute is zero or null, the registration CSE sends a positioning request message to a location server.

In an embodiment, the method may further include the following acts. After the registration CSE sends the positioning request message to the location server, a response message is received from the location server. When the response message contains an identifier allocated to a current positioning request, a 'positioning process association identifier' attribute is created for the 'location management' resource, and a value of the 'positioning process association identifier' attribute is set as the identifier contained in the response message and allocated to the current periodic positioning request.

In an embodiment, the act of performing positioning control according to the positioning parameter carried in the resource request may include the following acts. When the positioning parameter carried in the resource request includes the positioning interval or includes the positioning interval and the positioning duration, and when the value of the positioning interval in the resource request is zero or null, the 'positioning interval' attribute of the 'location management' resource is queried. When the value of the 'positioning interval' attribute is not zero or not null, the registration CSE sends a positioning stop message to a location server.

In an embodiment, the act of performing positioning control according to the positioning parameter carried in the resource request may include the following acts. When the positioning parameter carried in the updated resource request includes the positioning interval and the positioning duration, and when the value of the positioning interval in the resource request is zero or null, the 'positioning duration' attribute of the 'location management' resource is queried. When the value of the 'positioning duration' attribute is not zero or not null, the registration CSE sends a positioning stop message to a location server.

In an embodiment, the act of sending, by the registration CSE, the positioning stop message to the location server may include an act that the registration CSE sends, to the location server, the positioning stop message carrying a value of a 'positioning process association identifier' attribute of the 'location management' resource.

Another embodiment of the disclosure provides a registration CSE. The registration CSE may include: a message receiving module and a control module.

The message receiving module is configured to receive a resource request carrying a positioning parameter, and the positioning parameter may include a positioning interval and/or a positioning duration.

The control module is configured to perform positioning control according to the positioning parameter carried in the resource request.

In an embodiment, the message receiving module may be further configured to: create a 'location management' resource of a location management type according to the resource request; when the positioning parameter carried in the resource request includes the positioning interval, create, for the 'location management' resource, a 'positioning interval' attribute whose value is set as a value of the positioning interval in the resource request; and when the positioning parameter carried in the resource request includes the positioning duration, create, for the 'location management' resource, a 'positioning duration' attribute whose value is set as a value of the positioning duration in the resource request.

In an embodiment, the control module may be further configured to: query, when the positioning parameter carried in the resource request includes the positioning interval or includes the positioning interval and the positioning duration, and when the value of the positioning interval in the resource request is not zero or not null, the 'positioning interval' attribute of the 'location management' resource; and send a positioning request message to a location server when the 'positioning interval' attribute does not exist or the value of the 'positioning interval' attribute is zero or null.

In an embodiment, the control module may be further configured to: query, when the positioning parameter carried in the resource request includes the positioning interval and the positioning duration, and when the value of the positioning interval in the resource request is not zero or not null, the 'positioning duration' attribute of the 'location management' resource; and send a positioning request message to a location server when the 'positioning duration' attribute does not exist or the value of the 'positioning duration' attribute is zero or null.

In an embodiment, the control module may be further configured to: receive, after sending the positioning request message to the location server, a response message from the location server, create, when the response message contains an identifier allocated to a current positioning request, a 'positioning process association identifier' attribute for the 'location management' resource, and set a value of the 'positioning process association identifier' attribute as the identifier contained in the response message and allocated to the current periodic positioning request.

In an embodiment, the control module may be further configured to: query, when the positioning parameter carried in the resource request include the positioning interval or include the positioning interval and the positioning duration, and when the value of the positioning interval in the resource request is zero or null, the 'positioning interval' attribute of the 'location management' resource; and send a positioning stop message to a location server when the value of the 'positioning interval' attribute is not zero or not null.

In an embodiment, the control module may be further configured to: query, when the positioning parameter carried in the updated resource request includes the positioning interval and the positioning duration, and when the value of the positioning interval in the resource request is zero or null, the 'positioning duration' attribute of the 'location management' resource; and send a positioning stop message to a location server when the value of the 'positioning duration' attribute is not zero or not null.

In an embodiment, the control module may be further configured to carry a value of a 'positioning process association identifier' attribute of the 'location management' resource in the positioning stop message sent to the location server.

Still another embodiment of the disclosure provides a system for controlling acquisition of location information of an M2M node. The system may include: an AE or CSE, a registration CSE and a location server.

The AE or CSE is configured to send a resource request carrying a positioning parameter to the registration CSE, and the positioning parameter may include a positioning interval and/or a positioning duration.

The registration CSE is configured to receive the resource request carrying the positioning parameter, and perform positioning control according to the positioning parameter carried in the resource request.

The location server is configured to execute a positioning operation based on positioning control of the registration CSE.

In an embodiment, the registration CSE may be further configured to: create a 'location management' resource of a location management type according to the resource request;

when the positioning parameter carried in the resource request includes the positioning interval, create, for the 'location management' resource, a 'positioning interval' attribute whose value is set as a value of the positioning interval in the resource request; and when the positioning parameter carried in the resource request includes the positioning duration, create, for the 'location management' resource, a 'positioning duration' attribute whose value is set as a value of the positioning duration in the resource request.

In an embodiment, the registration CSE may be further configured to: query, when the positioning parameter carried in the resource request includes the positioning interval or include the positioning interval and the positioning duration, and when the value of the positioning interval in the resource request is not zero or not null, the 'positioning interval' attribute of the 'location management' resource; and when sends a positioning request message to the location server the 'positioning interval' attribute does not exist or the value of the 'positioning interval' attribute is zero or null.

In an embodiment, the registration CSE may be further configured to: query, when the positioning parameter carried in the resource request includes the positioning interval and the positioning duration, and when the value of the positioning interval in the resource request is not zero or not null, the 'positioning duration' attribute of the 'location management' resource; and send a positioning request message to the location server when the 'positioning duration' attribute does not exist or the value of the 'positioning duration' attribute is zero or null.

In an embodiment, the registration CSE may be further configured to: receive, after sending the positioning request message to the location server, a response message from the location server, create, when the response message contains an identifier allocated to a current positioning request, a 'positioning process association identifier' attribute for the 'location management' resource, and set a value of the 'positioning process association identifier' attribute as the identifier contained in the response message and allocated to the current periodic positioning request.

In an embodiment, the registration CSE may be further configured to: query, when the positioning parameter carried in the resource request includes the positioning interval or include the positioning interval and the positioning duration, and when the value of the positioning interval in the resource request is zero or null, the 'positioning interval' attribute of the 'location management' resource; and sends a positioning stop message to the location server when the value of the 'positioning interval' attribute is not zero or not null.

In an embodiment, the registration CSE may be further configured to: query, when the positioning parameter carried in the updated resource request includes the positioning interval and the positioning duration, and when the value of the positioning interval in the resource request is zero or null, the 'positioning duration' attribute of the 'location management' resource; and send a positioning stop message to the location server when the value of the 'positioning duration' attribute is not zero or not null.

In an embodiment, the registration CSE may be further configured to carry a value of a 'positioning process association identifier' attribute of the 'location management' resource in the positioning stop message sent to the location server.

A storage medium is provided. A computer program may be stored in the storage medium. The computer program may be configured to execute the method for controlling acquisition of location information of an M2M node.

The embodiments of the disclosure provide a method, apparatus and system for controlling acquisition of location information of an M2M node, and a storage medium. A registration CSE receives a resource request carrying a positioning parameter, and performs positioning control according to the positioning parameter carried in the resource request, and the positioning parameter may include a positioning interval and/or a positioning duration. By virtue of the solution according to some embodiments of the present disclosure, an initiator M2M node can be allowed to flexibly control acquisition of location information, thereby reducing unnecessary resource consumption and preventing unnecessary expenses.

DETAILED DESCRIPTION OF THE EMBODIMENTS

In the embodiments of the disclosure, a registration CSE receives a resource request carrying a positioning parameter, and performs positioning control according to the positioning parameter carried in the resource request. In the embodiments, the positioning parameter may include a positioning interval and/or a positioning duration.

The disclosure will be further described in detail hereinbelow with reference to the drawings and specific embodiments.

Figure 1:
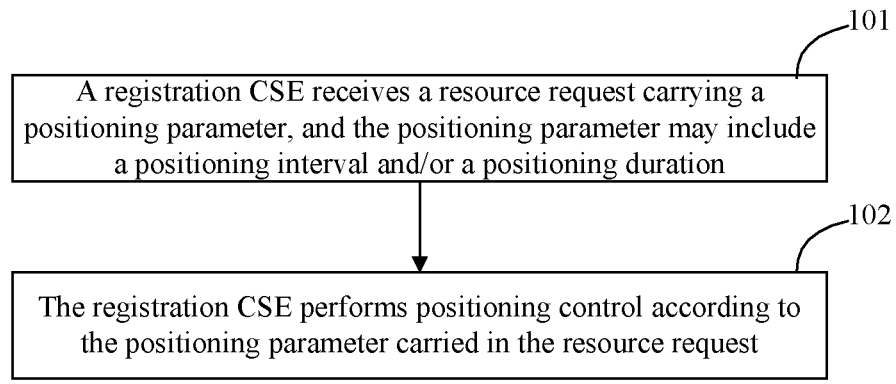
FIG. 1 is a flowchart of a method for controlling acquisition of location information of an M2M node according to an embodiment of the disclosure.

An embodiment of the disclosure provides a method for controlling acquisition of location information of an M2M node. As shown in FIG. 1, the method includes the acts as follows.

At act 101, a registration CSE receives a resource request carrying a positioning parameter. The positioning parameter may include a positioning interval and/or a positioning duration.

The present act may further include the following operations. The registration CSE creates a 'location management' resource of a location management type according to the resource request. When the positioning parameter carried in the resource request includes the positioning interval, the registration CSE creates, for the 'location management' resource, the following:

a 'positioning interval' attribute whose value is set as a value of the positioning interval in the resource request.

When the positioning parameter carried in the resource request includes the positioning duration, the registration CSE creates, for the 'location management' resource, the following:

a 'positioning duration' attribute whose value is set as a value of the positioning duration in the resource request.

At act 102, the registration CSE performs positioning control according to the positioning parameter carried in the resource request.

Specifically, when the positioning parameter carried in the resource request includes the positioning interval or includes the positioning interval and the positioning duration, and when the value of the positioning interval in the resource request is not zero or not null, the 'positioning interval' attribute of the 'location management' resource is queried. When the 'positioning interval' attribute does not exist or the value of the 'positioning interval' attribute is zero or null, the registration CSE sends a positioning request message to a location server.

When the positioning parameter carried in the resource request includes the positioning interval and the positioning duration, and when the value of the positioning interval in the resource request is not zero or not null, the 'positioning duration' attribute of the 'location management' resource is queried. When the 'positioning duration' attribute does not exist or the value of the 'positioning duration' attribute is zero or null, the registration CSE sends a positioning request message to a location server.

When the positioning parameter carried in the resource request includes the positioning interval or includes the positioning interval and the positioning duration, and when the value of the positioning interval in the resource request is zero or null, the 'positioning interval' attribute of the 'location management' resource is queried. When the value of the 'positioning interval' attribute is not zero or not null, the registration CSE sends a positioning stop message to a location server to instruct the location server to stop providing the location information.

When the positioning parameter carried in the updated resource request includes the positioning interval and the positioning duration, and when the value of the positioning interval in the resource request is zero or null, the 'positioning duration' attribute of the 'location management' resource is queried. When the value of the 'positioning duration' attribute is not zero or not null, the registration CSE sends a positioning stop message to a location server to instruct the location server to stop providing the location information.

The present act may further include the following operations. After the registration CSE sends the positioning request message to the location server, a response message is received from the location server. When the response message contains an identifier allocated to a current positioning request, a 'positioning process association identifier' attribute is created for the 'location management' resource, and a value of the 'positioning process association identifier' attribute is set as the identifier contained in the response message and allocated to the current periodic positioning request. Some exemplary implementations are described below.

In an exemplary implementation, when the positioning parameter includes the positioning interval, the registration CSE sends a 'triggered location reporting request' signaling to a location server. In the signaling, the value of an 'msid' parameter is set as the value of a 'target identifier' attribute of the 'location management' resource, and the value of an 'interval' parameter is set as the value of the 'positioning interval' attribute.

The registration CSE receives a response message returned by the location server, the response message including an 'lcs_ref' parameter. The 'lcs_ref' parameter is used for identifying a process that is requested by the registration CSE to periodically acquire positioning information. The registration CSE creates a 'positioning process association identifier' attribute for the 'location management' resource, and sets the value of the 'positioning process association identifier' attribute as a received process identifier of a current periodic positioning request, namely as the received 'lcs_ref' parameter.

Or, the registration CSE sends a 'create new periodic notification subscription' signaling to a location server. In the signaling, the value of an 'address' parameter is set as the value of a 'target identifier' attribute of the 'location management' resource, and the value of a 'frequency' parameter is set as the value of the 'positioning interval' attribute.

The location server creates a subscription resource for the 'create new periodic notification subscription' signaling of the registration CSE, and sends a corresponding subscription id to the registration CSE. The subscription id may be a character string capable of uniquely identifying the subscription resource on the location server, or may be an address of the subscription resource. In general, the subscription id is able to be associated with the created subscription resource. The registration CSE creates a 'positioning process association identifier' attribute for the 'location management' resource, and sets the value of the 'positioning process association identifier' attribute as the received subscription id.

In another exemplary implementation, when the positioning parameter includes the positioning interval and the positioning duration, the registration CSE sends a 'triggered location reporting request' signaling to a location server. In the signaling, the value of an 'msid' parameter is set as the value of a 'target identifier' attribute of the 'location management' resource, the value of an 'interval' parameter is set as the value of the 'positioning interval' attribute, and the value of a 'duration' parameter is set as the value of the 'positioning duration' attribute.

The registration CSE receives a response message returned by the location server, the response message including an 'lcs_ref' parameter. The 'lcs_ref' parameter is used for identifying a process that is requested by the registration CSE to periodically acquire positioning information. The registration CSE creates a 'positioning process association identifier' attribute for the 'location management' resource, and sets the value of the 'positioning process association identifier' attribute as a received process identifier of a current periodic positioning request, namely as the received 'lcs_ref' parameter.

Or, the registration CSE sends a 'create new periodic notification subscription' signaling to a location server. In the signaling, the value of an 'address' parameter is set as the value of a 'target identifier' attribute of the 'location management' resource, the value of a 'frequency' parameter is set as the value of the 'positioning interval' attribute, and the value of a 'duration' parameter is set as the value of the 'positioning duration' attribute.

The location server creates a subscription resource for the 'create new periodic notification subscription' signaling of the registration CSE, and sends a corresponding subscription id to the registration CSE. The subscription id may be a character string capable of uniquely identifying the subscription resource on the location server, or may be an address of the subscription resource. In general, the subscription id is able to be associated with the created subscription resource. The registration CSE creates a 'positioning process association identifier' attribute for the 'location management' resource, and sets the value of the 'positioning process association identifier' attribute as the received subscription id.

Here, the act of sending, by the registration CSE, the positioning stop message to the location server may include an act of sending, by the registration CSE to the location server, the positioning stop message carrying a value of a 'positioning process association identifier' attribute of the 'location management' resource. Some exemplary implementations of this act are described below.

In an exemplary implementation, the registration CSE sends a 'triggered location reporting stop request' signaling to a location server. In the signaling, the value of an 'lcs_ref' parameter is set as the value of the 'positioning process association identifier' attribute of the 'location management' resource. Here, the 'lcs_ref' parameter is used for identifying a process that is requested by the registration CSE to periodically acquire positioning information.

In another exemplary implementation, the registration CSE sends a 'delete subscription with subscription id' signaling to a location server, the signaling including the value of a 'positioning process association identifier' attribute of the 'location management' resource.

Figure 2:
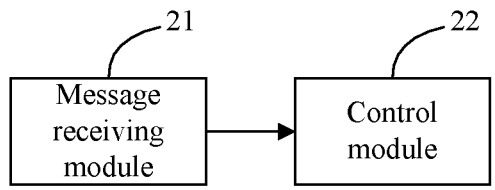
FIG. 2 is a structural diagram of a registration CSE according to an embodiment of the disclosure.

In order to implement the above-mentioned method, another embodiment of the disclosure also provides a registration CSE. As shown in FIG. 2, the registration CSE includes: a message receiving module 21 and a control module 22.

The message receiving module 21 may be configured to receive a resource request carrying a positioning parameter, and the positioning parameter may include a positioning interval and/or a positioning duration.

The control module 22 may be configured to perform positioning control according to the positioning parameter carried in the resource request.

Here, the message receiving module 21 may be further configured to: create a 'location management' resource of a location management type according to the resource request; when the positioning parameter carried in the resource request includes the positioning interval, create, for the 'location management' resource, the following:

a 'positioning interval' attribute whose value is set as a value of the positioning interval in the resource request; and when the positioning parameter carried in the resource request includes the positioning duration, create, for the 'location management' resource, the following:

a 'positioning duration' attribute whose value is set as a value of the positioning duration in the resource request.

The control module 22 may be further configured to: query, when the positioning parameter carried in the resource request includes the positioning interval or includes the positioning interval and the positioning duration, and when the value of the positioning interval in the resource request is not zero or not null, the 'positioning interval' attribute of the 'location management' resource; and send a positioning request message to a location server when the 'positioning interval' attribute does not exist or the value of the 'positioning interval' attribute is zero or null; or, query, when the positioning parameter carried in the resource request includes the positioning interval and the positioning duration, and when the value of the positioning interval in the resource request is not zero or not null, the 'positioning duration' attribute of the 'location management' resource; and send a positioning request message to a location server when the 'positioning duration' attribute does not exist or the value of the 'positioning duration' attribute is zero or null; or, query, when the positioning parameter carried in the resource request include the positioning interval or include the positioning interval and the positioning duration, and when the value of the positioning interval in the resource request is zero or null, the 'positioning interval' attribute of the 'location management' resource; and send, when the value of the 'positioning interval' attribute is not zero or not null, a positioning stop message to a location server to instruct the location server to stop providing the location information; or, query, when the positioning parameter carried in the updated resource request includes the positioning interval and the positioning duration, and when the value of the positioning interval in the resource request is zero or null, the 'positioning duration' attribute of the 'location management' resource; and send, when the value of the 'positioning duration' attribute is not zero or not null, a positioning stop message to a location server to instruct the location server to stop providing the location information.

The control module 22 may be further configured to: receive, after sending the positioning request message to the location server, a response message from the location server, create, when the response message contains an identifier allocated to a current positioning request, a 'positioning process association identifier' attribute for the 'location management' resource, and set a value of the 'positioning process association identifier' attribute as the identifier contained in the response message and allocated to the current periodic positioning request. Some exemplary implementations are described below.

In an exemplary implementation, when the positioning parameter includes the positioning interval, the control module 22 sends a 'triggered location reporting request' signaling to a location server. In the signaling, the value of an 'msid' parameter is set as the value of a 'target identifier' attribute of the 'location management' resource, and the value of an 'interval' parameter is set as the value of the 'positioning interval' attribute.

The control module 22 receives a response message returned by the location server, the response message including an 'lcs_ref' parameter. The 'lcs_ref' parameter is used for identifying a process that is requested by the registration CSE to periodically acquire positioning information. The control module 22 creates a 'positioning process association identifier' attribute for the 'location management' resource, and sets the value of the 'positioning process association identifier' attribute as a received process identifier of a current periodic positioning request, namely as the received 'lcs_ref' parameter.

Or, the control module 22 sends a 'create new periodic notification subscription' signaling to a location server. In the signaling, the value of an 'address' parameter is set as the value of a 'target identifier' attribute of the 'location management' resource, and the value of a 'frequency' parameter is set as the value of the 'positioning interval' attribute.

The control module 22 receives a subscription id that is returned after the location server creates a subscription resource for the 'create new periodic notification subscription' signaling, creates a 'positioning process association identifier' attribute for the 'location management' resource, and sets the value of the 'positioning process association identifier' attribute as a received subscription id. The subscription id may be a character string capable of uniquely identifying the subscription resource on the location server, or may be an address of the subscription resource. In general, the subscription id is able to be associated with the created subscription resource.

In another exemplary implementation, when the positioning parameter includes the positioning interval and the positioning duration, the control module 22 sends a 'triggered location reporting request' signaling to a location server. In the signaling, the value of an 'msid' parameter is set as the value of a 'target identifier' attribute of the 'location management' resource, the value of an 'interval' parameter is set as the value of the 'positioning interval' attribute, and the value of a 'duration' parameter is set as the value of the 'positioning duration' attribute.

The control module 22 receives a response message returned by the location server, the response message including an 'lcs_ref' parameter. The 'lcs_ref' parameter is used for identifying a process that is requested by the registration CSE to periodically acquire positioning information. The control module 22 creates a 'positioning process association identifier' attribute for the 'location management' resource, and sets the value of the 'positioning process association identifier' attribute as a received process identifier of a current periodic positioning request, namely as the received 'lcs_ref' parameter.

Or, the control module 22 sends a 'create new periodic notification subscription' signaling to a location server. In the signaling, the value of an 'address' parameter is set as the value of a 'target identifier' attribute of the 'location management' resource, the value of a 'frequency' parameter is set as the value of the 'positioning interval' attribute, and the value of a 'duration' parameter is set as the value of the 'positioning duration' attribute.

The control module 22 receives a subscription id that is returned after the location server creates a subscription resource for the 'create new periodic notification subscription' signaling, creates a 'positioning process association identifier' attribute for the 'location management' resource, and sets the value of the 'positioning process association identifier' attribute as a received subscription id. The subscription id may be a character string capable of uniquely identifying the subscription resource on the location server, or may be an address of the subscription resource. In general, the subscription id is able to be associated with the created subscription resource.

The control module 22 may be further configured to carry a value of a 'positioning process association identifier' attribute of the 'location management' resource in the positioning stop message sent to the location server. Some exemplary implementations are described below.

In an exemplary implementation, the control module 22 sends a 'triggered location reporting stop request' signaling to a location server. In the signaling, the value of an 'lcs_ref' parameter is set as the value of a 'positioning process association identifier' attribute of the 'location management' resource. Here, the 'lcs_ref' parameter is used for identifying a process that is requested by the registration CSE to periodically acquire positioning information.

In another exemplary implementation, a 'delete subscription with subscription id' signaling is sent to a location server, the signaling including the value of a 'positioning process association identifier' attribute of the 'location management' resource.

In practical application, functions of the message receiving module 21 and the control module 22 may be implemented by a Central Processing Unit (CPU), a Micro Processing Unit (MPU), a Digital Signal Processor (DSP) or a Field-Programmable Gate Array (FPGA).

Figure 3:
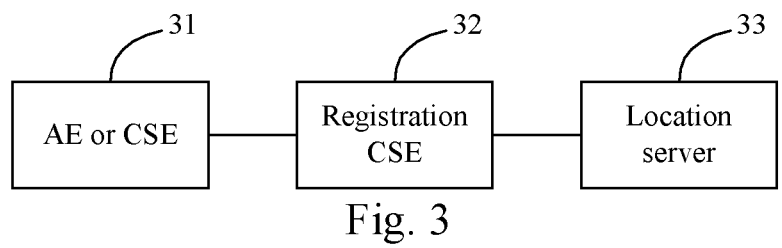
FIG. 3 is a structural diagram of a system for controlling acquisition of location information of an M2M node according to an embodiment of the disclosure.

On the basis of the above-mentioned registration CSE, still another embodiment of the disclosure also provides a system for controlling acquisition of location information of an M2M node. As shown in FIG. 3, the system includes: an AE or CSE 31, a registration CSE 32 and a location server 33.

The AE or CSE 31 is configured to send a resource request carrying a positioning parameter to the registration CSE, and the positioning parameter may include a positioning interval and/or a positioning duration.

The registration CSE 32 is configured to receive the resource request carrying the positioning parameter, and perform positioning control according to the positioning parameter carried in the resource request.

The location server 33 is configured to execute a positioning operation based on positioning control of the registration CSE.

The registration CSE 32 may be further configured to: create a 'location management' resource of a location management type according to the resource request; when the positioning parameter carried in the resource request includes the positioning interval, create, for the 'location management' resource, the following:

a 'positioning interval' attribute whose value is set as a value of the positioning interval in the resource request; and when the positioning parameter carried in the resource request includes the positioning duration, create, for the 'location management' resource, the following:

a 'positioning duration' attribute whose value is set as a value of the positioning duration in the resource request.

The registration CSE 32 may be further configured to: query, when the positioning parameter carried in the resource request includes the positioning interval or includes the positioning interval and the positioning duration, and when the value of the positioning interval in the resource request is not zero or not null, the 'positioning interval' attribute of the 'location management' resource; and send a positioning request message to the location server 33 when the 'positioning interval' attribute does not exist or the value of the 'positioning interval' attribute is zero or null; or, query, when the positioning parameter carried in the resource request includes the positioning interval and the positioning duration, and when the value of the positioning interval in the resource request is not zero or not null, the 'positioning duration' attribute of the 'location management' resource; and send a positioning request message to the location server 33 when the 'positioning duration' attribute does not exist or the value of the 'positioning duration' attribute is zero or null; or, query, when the positioning parameter carried in the resource request include the positioning interval or include the positioning interval and the positioning duration, and when the value of the positioning interval in the resource request is zero or null, the 'positioning interval' attribute of the 'location management' resource; and send, when the value of the 'positioning interval' attribute is not zero or not null, a positioning stop message to the location server 33 to instruct the location server to stop providing the location information; or, query, when the positioning parameter carried in the updated resource request includes the positioning interval and the positioning duration, and when the value of the positioning interval in the resource request is zero or null, the 'positioning duration' attribute of the 'location management' resource; and send, when the value of the 'positioning duration' attribute is not zero or not null, a positioning stop message to the location server 33 to instruct the location server to stop providing the location information.

The registration CSE 32 may be further configured to: receive, after sending the positioning request message to the location server 33, a response message from the location server, create, when the response message contains an identifier allocated to a current positioning request, a 'positioning process association identifier' attribute for the 'location management' resource, and set a value of the 'positioning process association identifier' attribute as the identifier contained in the response message and allocated to the current periodic positioning request. Some exemplary implementations are described below.

In an exemplary implementation, when the positioning parameter includes the positioning interval, the registration CSE 32 sends a 'triggered location reporting request' signaling to the location server 33. In the signaling, the value of an 'msid' parameter is set as the value of a 'target identifier' attribute of the 'location management' resource, and the value of an 'interval' parameter is set as the value of the 'positioning interval' attribute.

The registration CSE 32 receives a response message returned by the location server 33, the response message including an 'lcs_ref' parameter. The 'lcs_ref' parameter is used for identifying a process that is requested by the registration CSE 32 to periodically acquire positioning information. The registration CSE 32 creates a 'positioning process association identifier' attribute for the 'location management' resource, and sets the value of the 'positioning process association identifier' attribute as a received process identifier of a current periodic positioning request, namely as the received 'lcs_ref' parameter.

Or, the registration CSE 32 sends a 'create new periodic notification subscription' signaling to the location server 33. In the signaling, the value of an 'address' parameter is set as the value of a 'target identifier' attribute of the 'location management' resource, and the value of a 'frequency' parameter is set as the value of the 'positioning interval' attribute.

The location server 33 creates a subscription resource for the 'create new periodic notification subscription' signaling of the registration CSE 32, and sends a corresponding subscription id to the registration CSE 32. The subscription id may be a character string capable of uniquely identifying the subscription resource on the location server, or may be an address of the subscription resource. In general, the subscription id is able to be associated with the created subscription resource. The registration CSE 32 creates a 'positioning process association identifier' attribute for the 'location management' resource, and sets the value of the 'positioning process association identifier' attribute as the received subscription id.

In another exemplary implementation, when the positioning parameter includes the positioning interval and the positioning duration, the registration CSE 32 sends a 'triggered location reporting request' signaling to the location server 33. In the signaling, the value of an 'msid' parameter is set as the value of a 'target identifier' attribute of the 'location management' resource, the value of an 'interval' parameter is set as the value of the 'positioning interval' attribute, and the value of a 'duration' parameter is set as the value of the 'positioning duration' attribute.

The registration CSE 32 receives a response message returned by the location server 33, the response message including an 'lcs_ref' parameter. The 'lcs_ref' parameter is used for identifying a process that is requested by the registration CSE 32 to periodically acquire positioning information. The registration CSE 32 creates a 'positioning process association identifier' attribute for the 'location management' resource, and sets the value of the 'positioning process association identifier' attribute as a received process identifier of a current periodic positioning request, namely as the received 'lcs_ref' parameter.

Or, the registration CSE 32 sends a 'create new periodic notification subscription' signaling to the location server 33. In the signaling, the value of an 'address' parameter is set as the value of a 'target identifier' attribute of the 'location management' resource, the value of a 'frequency' parameter is set as the value of the 'positioning interval' attribute, and the value of a 'duration' parameter is set as the value of the 'positioning duration' attribute.

The location server 33 creates a subscription resource for the 'create new periodic notification subscription' signaling of the registration CSE 32, and sends a corresponding subscription id to the registration CSE. The subscription id may be a character string capable of uniquely identifying the subscription resource on the location server, or may be an address of the subscription resource. In general, the subscription id is able to be associated with the created subscription resource. The registration CSE 32 creates a 'positioning process association identifier' attribute for the 'location management' resource, and sets the value of the 'positioning process association identifier' attribute as the received subscription id.

The registration CSE 32 may be further configured to carry a value of a 'positioning process association identifier' attribute of the 'location management' resource in the positioning stop message sent, by the registration CSE, to the location server 33. Some exemplary implementations are described below.

In an exemplary implementation, the registration CSE 32 sends a 'triggered location reporting stop request' signaling to the location server 33. In the signaling, the value of an 'lcs_ref' parameter is set as the value of the 'positioning process association identifier' attribute of the 'location management' resource. Here, the 'lcs_ref' parameter is used for identifying a process that is requested by the registration CSE to periodically acquire positioning information.

In another exemplary implementation, the registration CSE 32 sends a 'delete subscription with subscription id' signaling to the location server 33, the signaling including the value of a 'positioning process association identifier' attribute of the 'location management' resource.

The method of the disclosure is specifically described hereinbelow based on specific scenarios.

FIRST EXAMPLE

In the present example, a positioning parameter includes a positioning interval. A method for controlling acquisition of location information of an M2M node includes the acts as follows.

At act S1, an AE1 sends a resource creating request to a registration CSE, the resource creating request including:

(1) resource type: location management;

(2) target identifier: identifier of a target node needing to obtain location information;

(3) positioning interval: interval time for acquiring next location information during periodic acquisition of location information; and (4) positioning manner, which may be set to be device-based or network-based.

At act S2, after receiving the resource creating request, the registration CSE creates a 'location management 1' resource of a location management type, and creates, for the 'location management 1' resource, the following:

a 'target identifier' attribute whose value is set as a value of a target identifier in a request message;

a 'positioning interval' attribute whose value is set as a value of a positioning interval in a request message;

a 'positioning manner' attribute whose value is set as a value of a positioning manner in a request message; and a 'location container' attribute, whose value is set at next act.

At act S3, the registration CSE creates a 'container 1' resource of a container type, and sets the value of the 'location container' attribute of the 'location management 1' as an address of the 'container 1' resource after creation is successful.

At act S4, the registration CSE sends a response message to the AE1, the response message including the address of the 'location management 1' resource.

At act S5, if the value of the 'positioning interval' attribute is not null or not zero, the registration CSE sends a positioning request message to a location server to instruct the location server to periodically provide location information.

In specific code-based implementation, sometimes, null is set as zero, and sometimes when zero has a specific meaning, another value may be set to be representative of null. For example, −9999999 may be set as null.

Here, the registration CSE may send the positioning request message to the location server in one of the following two manners.

(1) The registration CSE sends a 'triggered location reporting request' signaling to the location server. In the signaling, the value of an 'msid' parameter is set as the value of the 'target identifier' attribute of the 'location management 1' resource, and the value of the 'interval' parameter is set as the value of the 'positioning interval' attribute.

The location server sends a response message to the registration CSE, the response message including an 'lcs_ref' parameter. The 'lcs_ref' parameter is used for identifying a process that is requested by the registration CSE to periodically acquire positioning information. The registration CSE creates a 'positioning process association identifier' attribute for the 'location management 1' resource, and sets the value of the 'positioning process association identifier' attribute as the received 'lcs_ref' parameter.

(2) The registration CSE sends a 'create new periodic notification subscription' signaling to the location server. In the signaling, the value of an 'address' parameter is set as the value of the 'target identifier' attribute of the 'location management 1' resource, and the value of a 'frequency' parameter is set as the value of the 'positioning interval' attribute.

The location server creates a subscription resource for the 'create new periodic notification subscription' signaling of the registration CSE, and sends a corresponding subscription id to the registration CSE. The subscription id may be a character string capable of uniquely identifying the subscription resource on the location server, or may be an address of the subscription resource. In general, the subscription id is able to be associated with the created subscription resource. The registration CSE creates a 'positioning process association identifier' attribute for the 'location management 1' resource, and sets the value of the 'positioning process association identifier' attribute as the received subscription id.

At act S6, if the value of the 'positioning interval' attribute is null or zero, the registration CSE does not send a positioning request message to the location server temporarily, and the positioning request message may not be sent to the location server until the 'container 1' resource associated with the 'location management 1' resource is queried.

At act S7, the AE1 sends a resource update request to the registration CSE, the request message including:

(1) target resource address: set as an address of 'location management 1' resource; and (2) positioning interval: used for setting an update value of a 'positioning interval' attribute of a 'location management 1' resource.

At act S8, after receiving the resource update request, the registration CSE performs processing depending on which one of two situations S8.1 and S8.2 applies.

At act S8.1, if the value of the 'positioning interval' attribute in the resource update request is not zero or not null, the 'positioning interval' attribute of the 'location management 1' resource does not exist or the value of the 'positioning interval' attribute is zero or null, and the value of a 'positioning manner' attribute is set to be network-based, then the registration CSE sends a positioning request message to the location server to instruct the location server to periodically provide location information.

The registration CSE may send the positioning request message to the location server in one of the following two manners.

(1) The registration CSE sends a 'triggered location reporting request' signaling to the location server. In the signaling, the value of an 'msid' parameter is set as the value of the 'target identifier' attribute of the 'location management 1' resource, and the value of the 'interval' parameter is set as the value of the 'positioning interval' attribute.

The location server sends a response message to the registration CSE, the response message including an 'lcs_ref' parameter. The 'lcs_ref' parameter is used for identifying a process that is requested by the registration CSE to periodically acquire positioning information. The registration CSE creates a 'positioning process association identifier' attribute for the 'location management 1' resource, and sets the value of the 'positioning process association identifier' attribute as the received 'lcs_ref' parameter.

(2) The registration CSE sends a 'create new periodic notification subscription' signaling to the location server. In the signaling, the value of an 'address' parameter is set as the value of the 'target identifier' attribute of the 'location management 1' resource, and the value of a 'frequency' parameter is set as the value of the 'positioning interval' attribute.

The location server creates a subscription resource for the 'create new periodic notification subscription' signaling of the registration CSE, and sends a corresponding subscription id to the registration CSE. The subscription id may be a character string capable of uniquely identifying the subscription resource on the location server, or may be an address of the subscription resource. In general, the subscription id is able to be associated with the created subscription resource. The registration CSE creates a 'positioning process association identifier' attribute for the 'location management 1' resource, and sets the value of the 'positioning process association identifier' attribute as the received subscription id.

At act S8.2, if the value of the 'positioning interval' attribute in the request message is zero or null, the value of the 'positioning interval' attribute of the 'location management' resource is not zero or not null, and the value of a 'positioning manner' attribute is set to be network-based, then the registration CSE sends a positioning stop message to the location server to instruct the location server to stop providing location information.

The registration CSE may send the positioning stop message to the location server in one of the following two manners.

(1) The registration CSE sends a 'triggered location reporting stop request' signaling to the location server. In the signaling, the value of an 'lcs_ref' parameter is set as the value of a 'positioning process association identifier' attribute of the 'location management 1' resource.

(2) The registration CSE sends a 'delete subscription with subscription id' signaling to the location server, the signaling including the value of a 'positioning process association identifier' attribute of the 'location management 1' resource.

SECOND EXAMPLE

In the present example, a positioning parameter includes a positioning interval and a positioning duration. A method for controlling acquisition of location information of an M2M node includes the acts as follows.

At act S1, a CSE2 sends a resource creating request to a registration CSE, the request message including:

(1) resource type: location management;

(2) target identifier: identifier of a target node needing to obtain location information;

(3) positioning interval: interval time for acquiring next location information during periodic acquisition of location information;

(4) positioning duration: total time for acquiring location information during periodic acquisition of location information, wherein a process of periodically acquiring location information is stopped after the defined duration; and (5) positioning manner, which may be set to be device-based or network-based.

At act S2, after receiving the request, the registration CSE creates a 'location management 2' resource of a location management type, and creates, for the 'location management 2' resource, the following:

a 'target identifier' attribute whose value is set as a value of a target identifier in a request message;

a 'positioning interval' attribute whose value is set as a value of a positioning interval in a request message;

a 'positioning duration' attribute whose value is set as a value of a positioning duration in a request message;

a 'positioning manner' attribute whose value is set as a value of a positioning manner in a request message; and a 'location container' attribute, whose value is not set temporarily.

At act S3, the registration CSE creates a 'container 2' resource of a container type, and sets the value of the 'location container' attribute of the 'location management 2' resource as an address of the 'container 2' resource after creation is successful.

At act S4, the registration CSE sends a response message to the CSE2, the response message including the address of the 'location management 2' resource.

At act S5, if the value of the 'positioning duration' attribute is not null or not zero, the registration CSE sends a positioning request message to a location server to instruct the location server to periodically provide location information.

The registration CSE may send the positioning request message to the location server in one of the following two manners.

(1) The registration CSE sends a 'triggered location reporting request' signaling to the location server. In the signaling, the value of an 'msid' parameter is set as the value of a 'target identifier' attribute of the 'location management 2' resource, the value of an 'interval' parameter is set as the value of the 'positioning interval' attribute, and the value of a 'duration' parameter is set as the value of the 'positioning duration' attribute.

The location server sends a response message to the registration CSE, the response message including an 'lcs_ref' parameter. The 'lcs_ref' parameter is used for identifying a process that is requested by the registration CSE to periodically acquire positioning information. The registration CSE creates a 'positioning process association identifier' attribute for the 'location management 2' resource, and sets the value of the 'positioning process association identifier' attribute as the received 'lcs_ref' parameter.

(2) The registration CSE sends a 'create new periodic notification subscription' signaling to the location server. In the signaling, the value of an 'address' parameter is set as the value of a 'target identifier' attribute of the 'location management 2' resource, the value of a 'frequency' parameter is set as the value of the 'positioning interval' attribute, and the value of a 'duration' parameter is set as the value of the 'positioning duration' attribute.

The location server creates a subscription resource for the 'create new periodic notification subscription' signaling of the registration CSE, and sends a corresponding subscription id to the registration CSE. The subscription id may be a character string capable of uniquely identifying the subscription resource on the location server, or may be an address of the subscription resource. In general, the subscription id is able to be associated with the created subscription resource. The registration CSE creates a 'positioning process association identifier' attribute for the 'location management 2' resource, and sets the value of the 'positioning process association identifier' attribute as the received subscription id.

At act S6, if the value of the 'positioning interval' attribute is null or zero, then the registration CSE does not send a positioning request message to the location server temporarily, and the positioning request message may not be sent to the location server until the 'container 2' resource associated with the 'location management 2' resource is queried.

At act S7, the CSE2 sends a resource update request to the registration CSE, the request message including:

(1) target resource address: set as an address of 'location management 2' resource; and (2) positioning duration: used for setting an update value of a 'positioning duration' attribute of a 'location management' resource.

At act S8, after receiving the request message, the registration CSE performs processing depending on which one of two situations S8.1 and S8.2 applies.

At act S8.1, if the value of the 'positioning duration' attribute in the request message is not zero or not null, the 'positioning duration' attribute of the 'location management 2' resource does not exist or the value of the 'positioning duration' attribute is zero or null, and the value of a 'positioning manner' attribute is set to be network-based, then the registration CSE sends a positioning request message to the location server to instruct the location server to periodically provide location information.

The registration CSE may send the positioning request message to the location server in one of the following two manners.

(1) The registration CSE sends a 'triggered location reporting request' signaling to the location server. In the signaling, the value of an 'msid' parameter is set as the value of a 'target identifier' attribute of the 'location management 2' resource, the value of an 'interval' parameter is set as the value of the 'positioning interval' attribute, and the value of a 'duration' parameter is set as the value of the 'positioning duration' attribute.

The location server sends a response message to the registration CSE, the response message including an 'lcs_ref' parameter. The 'lcs_ref' parameter is used for identifying a process that is requested by the registration CSE to periodically acquire positioning information. The registration CSE creates a 'positioning process association identifier' attribute for the 'location management 2' resource, and sets the value of the 'positioning process association identifier' attribute as the received 'lcs_ref' parameter.

(2) The registration CSE sends a 'create new periodic notification subscription' signaling to the location server. In the signaling, the value of an 'address' parameter is set as the value of a 'target identifier' attribute of the 'location management 2' resource, the value of a 'frequency' parameter is set as the value of the 'positioning interval' attribute, and the value of a 'duration' parameter is set as the value of the 'positioning duration' attribute.

The location server creates a subscription resource for the 'create new periodic notification subscription' signaling of the registration CSE, and sends a corresponding subscription id to the registration CSE. The subscription id may be a character string capable of uniquely identifying the subscription resource on the location server, or may be an address of the subscription resource. In general, the subscription id is able to be associated with the created subscription resource. The registration CSE creates a 'positioning process association identifier' attribute for the 'location management 2' resource, and sets the value of the 'positioning process association identifier' attribute as the received subscription id.

At act S8.2, if the value of the 'positioning duration' attribute in the request message is zero or null, the value of the 'positioning duration' attribute of the 'location management' resource is not zero or not null, and the value of a 'positioning manner' attribute is set to be network-based, then the registration CSE sends a positioning stop message to the location server to instruct the location server to stop providing location information.

The registration CSE may send the positioning stop message to the location server in one of the following two manners.

(1) The registration CSE sends a 'triggered location reporting stop request' signaling to the location server. In the signaling, the value of an 'lcs_ref' parameter is set as the value of a 'positioning process association identifier' attribute of the 'location management 2' resource.

(2) The registration CSE sends a 'delete subscription with subscription id' signaling to the location server, the signaling including the value of a 'positioning process association identifier' attribute of the 'location management 2' resource.

When being implemented in a form of software function module and sold or used as an independent product, the integrated module of the embodiments of the disclosure may also be stored in a computer-readable storage medium. Based on such an understanding, the solutions of the embodiments of the disclosure substantially or parts making contributions to the conventional art may be embodied in a form of software product, and the computer software product is stored in a storage medium, including multiple instructions configured to enable a computer device (which may be a personal computer, a server, a network device or the like) to execute all or part of the method in each embodiment of the disclosure. The above-mentioned storage medium includes: various media capable of storing program codes such as a U disk, a mobile hard disk, a Read-Only Memory (ROM), a magnetic disk or an optical disk. Thus, the embodiments of the disclosure are not limited to a combination of any specific hardware and software.

Correspondingly, the embodiments of the disclosure also provide a computer storage medium in which a computer program is stored. The computer program is used for executing functions of each module in the registration CSE of the embodiments of the disclosure.

The embodiment of the disclosure also provides a storage medium. A computer program is stored in the storage medium. The computer program is configured to execute the method for controlling acquisition of location information of an M2M node according to each of the above-mentioned embodiments.

The above is only the preferable embodiments of the disclosure, and not intended to limit the scope of protection of the disclosure. Any modifications, equivalent replacements, improvements and the like made within the spirit and principle of the disclosure shall fall within the scope of protection of the disclosure.

INDUSTRIAL APPLICABILITY

In the solution provided by some embodiments of the disclosure, a registration CSE receives a resource request carrying a positioning parameter, and performs positioning control according to the positioning parameter carried in the resource request, and the positioning parameter may include a positioning interval and/or a positioning duration. Thus, an initiator M2M node can be allowed to flexibly control acquisition of location information, thereby reducing unnecessary resource consumption and preventing unnecessary expenses.

What is claimed is:

1. A method for controlling acquisition of location information of a Machine-to-Machine (M2M) node, comprising:
receiving, by a registration Common Service Entity (CSE), a resource request carrying a positioning parameter, and performing, by the registration CSE, positioning control according to the positioning parameter carried in the resource request, wherein the positioning parameter comprises a positioning interval and/or a positioning duration;
creating, by the registration CSE, a location management resource of a location management type according to the resource request;
when the positioning parameter carried in the resource request comprises the positioning interval, creating, for the location management resource, a positioning interval attribute whose value is set as a value of the positioning interval in the resource request; and
when the positioning parameter carried in the resource request comprises the positioning duration, creating, for the location management resource, a positioning duration attribute whose value is set as a value of the positioning duration in the resource request;
wherein performing positioning control according to the positioning parameter carried in the resource request comprises one of the following:
when the positioning parameter carried in the resource request comprises the positioning interval or comprises the positioning interval and the positioning duration, and when the value of the positioning interval in the resource request is not zero or not null, querying the positioning interval attribute of the location management resource, and when the positioning interval attribute does not exist or the value of the positioning interval attribute is zero or null, sending, by the registration CSE, a positioning request message to a location server;
when the positioning parameter carried in the resource request comprises the positioning interval and the positioning duration, and when the value of the positioning interval in the resource request is not zero or not null, querying the positioning duration attribute of the location management resource, and when the positioning duration attribute does not exist or the value of the positioning duration attribute is zero or null, sending, by the registration CSE, a positioning request message to a location server;
when the positioning parameter carried in the resource request comprises the positioning interval or comprises the positioning interval and the positioning duration, and when the value of the positioning interval in the resource request is zero or null, querying the positioning interval attribute of the location management resource, and when the value of the positioning interval attribute is not zero or not null, sending, by the registration CSE, a positioning stop message to a location server;

when the positioning parameter carried in the resource request comprises the positioning interval and the positioning duration, and when the value of the positioning interval in the resource request is zero or null, querying the positioning duration attribute of the location management resource, and when the value of the positioning duration attribute is not zero or not null, sending, by the registration CSE, a positioning stop message to a location server.

2. The method as claimed in claim 1, further comprising: after the registration CSE sends the positioning request message to the location server, receiving a response message from the location server, when the response message contains an identifier allocated to a current positioning request, creating a 'positioning process association identifier' attribute for the 'location management' resource, and setting a value of the 'positioning process association identifier' attribute as the identifier contained in the response message and allocated to the current positioning request.

3. The method as claimed in claim 1, wherein sending, by the registration CSE, the positioning stop message to the location server comprises: sending, by the registration CSE to the location server, the positioning stop message carrying a value of a 'positioning process association identifier' attribute of the 'location management' resource.

4. A non-transitory storage medium, a computer program being stored in the storage medium, wherein the computer program is configured to execute the method for controlling acquisition of location information of a Machine-to-Machine (M2M) node as claimed in claim 1.

5. A registration Common Service Entity (CSE), comprising a hardware processor arranged to execute program modules comprising: a message receiving module and a control module, wherein the message receiving module is configured to receive a resource request carrying a positioning parameter, wherein the positioning parameter comprises a positioning interval and/or a positioning duration; and the control module is configured to perform positioning control according to the positioning parameter carried in the resource request;

wherein the message receiving module is further configured to: create a location management resource of a location management type according to the resource request;

when the positioning parameter carried in the resource request comprises the positioning interval, create, for the location management resource, a positioning interval attribute whose value is set as a value of the positioning interval in the resource request; and when the positioning parameter carried in the resource request comprises the positioning duration, create, for the location management resource, a positioning duration attribute whose value is set as a value of the positioning duration in the resource request;

wherein the control module is further configured to execute one of the following:

when the positioning parameter carried in the resource request comprises the positioning interval or comprises the positioning interval and the positioning duration, and when the value of the positioning interval in the resource request is not zero or not null, query the positioning interval attribute of the location management resource; and send a positioning request message to a location server when the positioning interval attribute does not exist or the value of the positioning interval attribute is zero or null;

when the positioning parameter carried in the resource request comprises the positioning interval and the positioning duration, and when the value of the positioning interval in the resource request is not zero or not null, query the positioning duration attribute of the location management resource; and send a positioning request message to a location server when the positioning duration attribute does not exist or the value of the positioning duration attribute is zero or null;

when the positioning parameter carried in the resource request comprises the positioning interval or comprises the positioning interval and the positioning duration, and when the value of the positioning interval in the resource request is zero or null, query the positioning interval attribute of the location management resource; and send a positioning stop message to a location server when the value of the positioning interval attribute is not zero or not null;

when the positioning parameter carried in the resource request comprises the positioning interval and the positioning duration, and when the value of the positioning interval in the resource request is zero or null, query the positioning duration attribute of the location management resource; and send a positioning stop message to a location server when the value of the 'positioning duration' attribute is not zero or not null.

6. The registration CSE as claimed in claim 5, wherein the control module is further configured to: receive, after sending the positioning request message to the location server, a response message from the location server, create, when the response message contains an identifier allocated to a current positioning request, a 'positioning process association identifier' attribute for the 'location management' resource, and set a value of the 'positioning process association identifier' attribute as the identifier contained in the response message and allocated to the current positioning request.

7. The registration CSE as claimed in claim 5, wherein the control module is further configured to carry a value of a 'positioning process association identifier' attribute of the 'location management' resource in the positioning stop message sent to the location server.

8. A system for controlling acquisition of location information of a Machine-to-Machine (M2M) node, comprising: an Application Entity (AE) or Common Service Entity (CSE), a location server and the registration CSE as claimed in claim 5, wherein the AE or CSE is configured to send a resource request carrying a positioning parameter to the registration CSE, wherein the positioning parameter comprises a positioning interval and/or a positioning duration;

the location server is configured to execute a positioning operation based on positioning control of the registration CSE.

* * * * *